US007337213B2

(12) United States Patent
Gusler et al.

(10) Patent No.: US 7,337,213 B2
(45) Date of Patent: Feb. 26, 2008

(54) METHOD AND APPARATUS FOR MANAGING MESSAGES IN A MESSAGING SESSION

(75) Inventors: Carl Phillip Gusler, Austin, TX (US); Rick Allen Hamilton, II, Charlottesville, VA (US); James Wesley Seaman, Falls Church, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/464,894

(22) Filed: Jun. 19, 2003

(65) Prior Publication Data

US 2004/0260771 A1 Dec. 23, 2004

(51) Int. Cl.
*G06F 15/16* (2006.01)
(52) U.S. Cl. .................. 709/206; 709/203; 709/217; 709/223
(58) Field of Classification Search ................ 709/203, 709/205–206, 217, 219, 223, 224
See application file for complete search history.

(56) References Cited

U.S. PATENT DOCUMENTS

| 6,119,101 | A | 9/2000 | Peckover | .................... | 705/26 |
| 6,212,548 | B1* | 4/2001 | DeSimone et al. | .......... | 709/204 |
| 6,301,609 | B1 | 10/2001 | Aravamudan et al. | ...... | 709/207 |
| 6,429,880 | B2 | 8/2002 | Marcos et al. | .............. | 345/744 |
| 7,058,682 | B2* | 6/2006 | McGee et al. | .............. | 709/204 |
| 2001/0047294 | A1 | 11/2001 | Rothschild | .................... | 705/14 |
| 2002/0023132 | A1* | 2/2002 | Tornabene et al. | .......... | 709/205 |
| 2002/0026351 | A1 | 2/2002 | Coleman | ..................... | 705/14 |
| 2002/0046099 | A1 | 4/2002 | Frengut et al. | ............... | 705/14 |
| 2002/0048349 | A1 | 4/2002 | Bixler et al. | ............... | 379/67.1 |
| 2002/0059590 | A1 | 5/2002 | Kitsukawa et al. | ........... | 725/36 |

* cited by examiner

*Primary Examiner*—Lashonda Jacobs
(74) *Attorney, Agent, or Firm*—Duke W. Yee; David A. Mims, Jr.; Theodore D. Fay, III

(57) ABSTRACT

A method, apparatus, and computer instructions for managing messages. In response to a request by an invitee to add a third party to a messaging session with a number of parties, a stealth invite is sent to the third party. If the stealth invite is accepted, messages sent to and received from the parties are sent to the third party without the number of parties knowing of a presence of the third party in the messaging session. The addition of the third party is not announced or indicated to the other parties. The third party also is unable to send messages to the other parties, but may in some cases send messages to the invitee. A recording feature allows a party to automatically record all messages that the party can see. This feature is initiated at the beginning of a messaging session and can be set as a default.

6 Claims, 5 Drawing Sheets

METHOD AND APPARATUS FOR MANAGING MESSAGES IN A MESSAGING SESSION

BACKGROUND OF THE INVENTION

1. Technical Field

The present invention relates generally to an improved data processing system and in particular to a method and apparatus for processing data. Still more particularly, the present invention provides a method and apparatus for managing messages sent and received during a messaging session.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Presently available instant messaging applications, however, include flaws which should be corrected for these applications to continue to be popular as a communications mechanism. One flaw recognized by the present invention is an inability to add a party to a chat session without all of the other parties being notified of the new party's presence being detected by one or more of the parties already part of the messaging session. Additionally, the present invention recognizes that the current messaging programs are limited in allowing recording of messaging sessions. Currently, a user must save the session after the session has completed. Also, if the user closes the window by accident, all prior messages are lost.

Therefore, it would be advantageous to have an improved method, apparatus, and computer instructions for managing messages and parties in a messaging session.

SUMMARY OF THE INVENTION

The present invention provides a method, apparatus, and computer instructions for managing messages. In response to a request by an invitee to add a third party to a messaging session with a number of parties, a stealth invite is sent to the third party. If the stealth invite is accepted, messages sent to and received from the parties are sent to the third party without the number of parties knowing of a presence of the third party in the messaging session. The addition of the third party is not announced or indicated to the other parties. The third party also is unable to send messages to the other parties, but may in some cases send messages to the invitee. A recording feature allows a party to automatically record all messages that the party can see. This feature is initiated at the beginning of a messaging session and can be set as a default.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
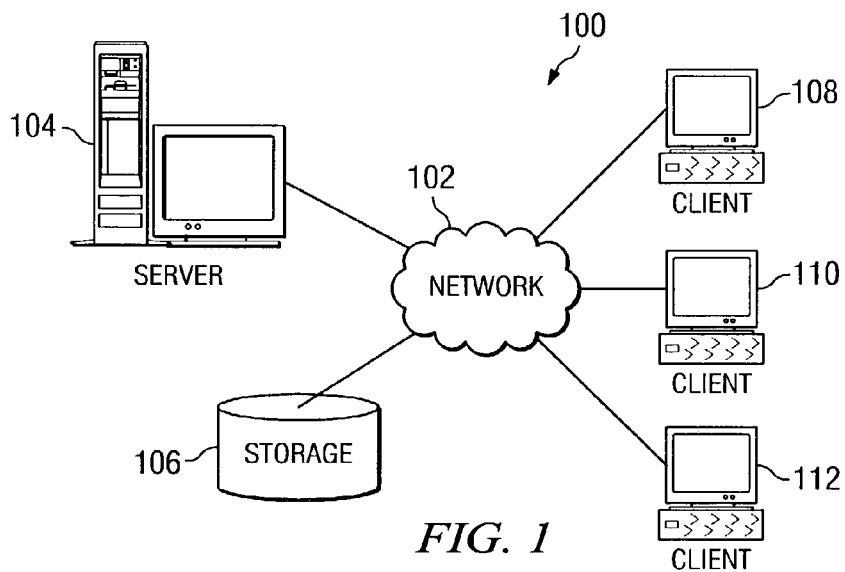
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
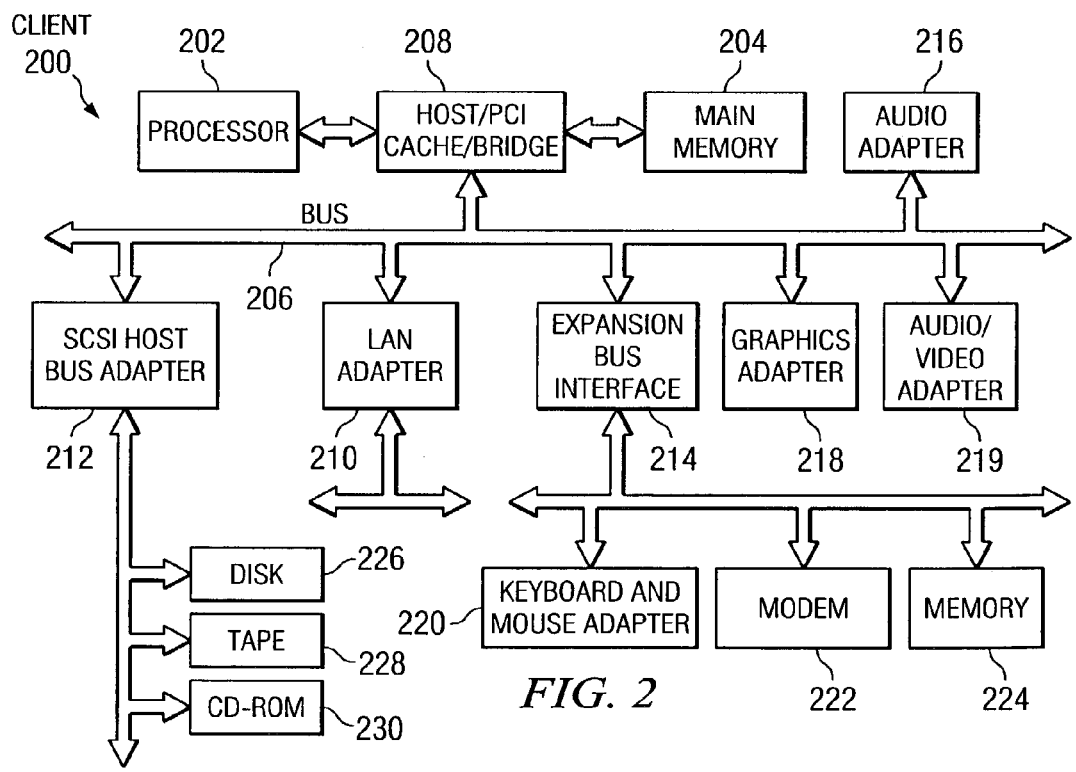
FIG. 2 is a block diagram of a data processing system that may be implemented in accordance with a preferred embodiment of the present invention.

With reference now to FIG. 2, a block diagram of a data processing system is shown in which the present invention may be implemented. Data processing system 200 is an example of a computer, such as client 108, 110, or 112 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
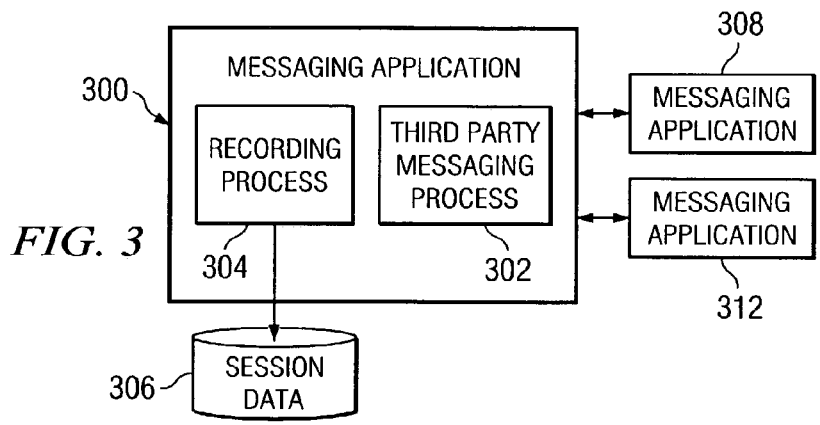
FIG. 3 is a diagram of components illustrating components used providing message handling features in accordance with a preferred embodiment of the present invention.

Turning now to FIG. 3, a diagram of components illustrating components used providing message handling features is depicted in accordance with a preferred embodiment of the present invention. Messaging application 300 includes third party chat process 302 and recording process 304. All messages handled by recording process 304 are stored in session data 306 without requiring user input or manual intervention.

A user may initiate a messaging session with another party at messaging application 308. With the recording feature of the present invention, a default may be set to automatically record all messages sent and received in all messaging sessions. In these examples, when the messaging session finishes or terminates, the user is provided with a prompt in the form of a dialog box with a message. The message may be for example: "This session will be saved as 'Chat on Jun. 2, 2003 15:06 AM' in the appropriate folder". The user may accept the name file and the default location or may enter an alternate name and/or location for the file.

In this example, the feature saves all messages sent between messaging application 308 and messaging application 300 using recording process 304. This feature does not require the user to have to remember to record the messaging session.

Further, third party messaging process allows a user to add a third party to a messaging session in a stealth or blind mode in which other parties to the messaging session do not know that the third party is present. For example, a user at messaging application 300 may initiate a messaging session with another user at messaging application 308. A dialog box is displayed at both messaging application 300 and messaging application 308. A conversation begins with messages being sent between the two messaging applications. Later, the user at messaging application 300 determines that it would be beneficial for a third party, using message application 312, to participate in the messaging session unknown to the user at messaging application 308.

The user at messaging application 300 selects an option to send an invitation to the user at messaging application 312 to join the messaging session. The user also may add a reason for the invitation, such as, for example, "I need your input into a proposal being made". In this case, the invitation is a stealth invitation, indicating that the third party will not be made know to the other parties in the messaging session. The invitation results in a dialog being presented to the user at messaging application 312. The dialog may, for example, state: "You have been requested to join a chat session via stealth entry" or "You have been requested to join a chat session via stealth entry, I need your input into a proposal being made".

If the third party at messaging application 312 accepts the invitation, a read only mode is established for the third party. Optionally, the third party may send messages to the user making the invitation, the user at messaging application 300. The third party at messaging application 312 is able to see all messages being sent between messaging application 300 and messaging application 308. The party at messaging application 308 does not know that the third party is seeing the messages being exchanged in the session between messaging application 300 and messaging application 308. The name of the third party is not shown in the messaging screen presented by messaging application 308. No indication or message is sent to messaging application 308 that the third party is present.

With a two way "stealth messaging" between messaging application 300 and messaging application 312, an additional dialog or area in the existing dialogs is employed to allow the party at messaging application 300 and the third party at messaging application 312 to exchange messages with each other without the party at messaging application 308 knowing of the presence of the third party. In these examples, the third party messaging process sends the messages sent and received between messaging application 300 and messaging application 308 to messaging application 312.

With the stealth messaging option, messaging application 312 also includes a process like third party messaging process 302. If the stealth messaging option is not used then such a process is not needed. Additionally, the third party messaging process may be located in a messaging server.

Figure 4A:
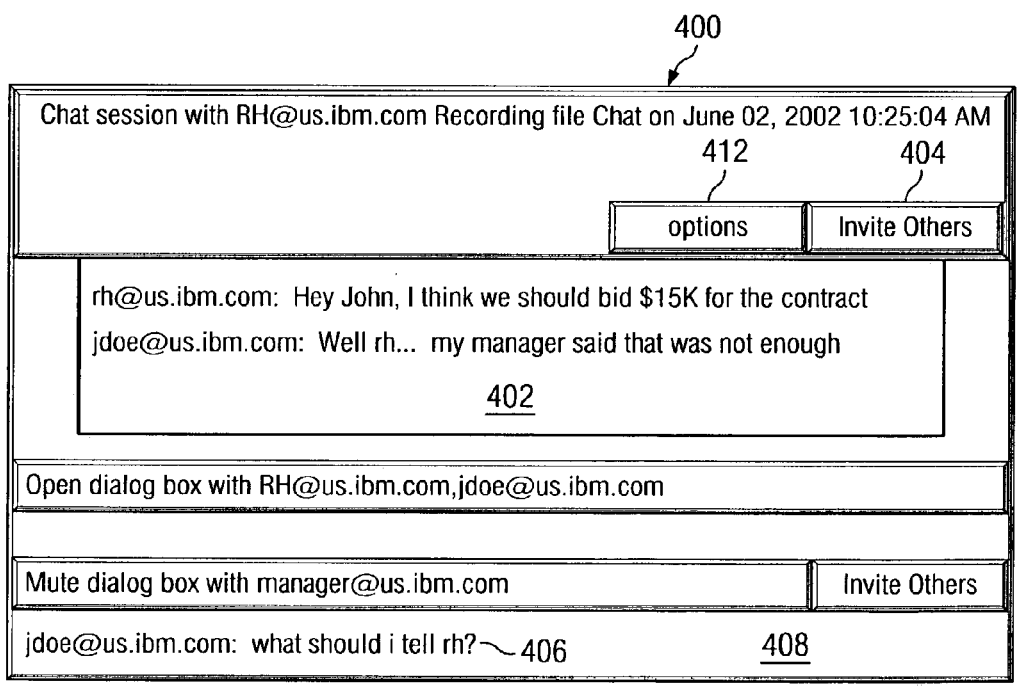
FIGS. 4A-4C are diagrams of a messaging dialog in accordance with a preferred embodiment of the present invention.
Figure 4B:
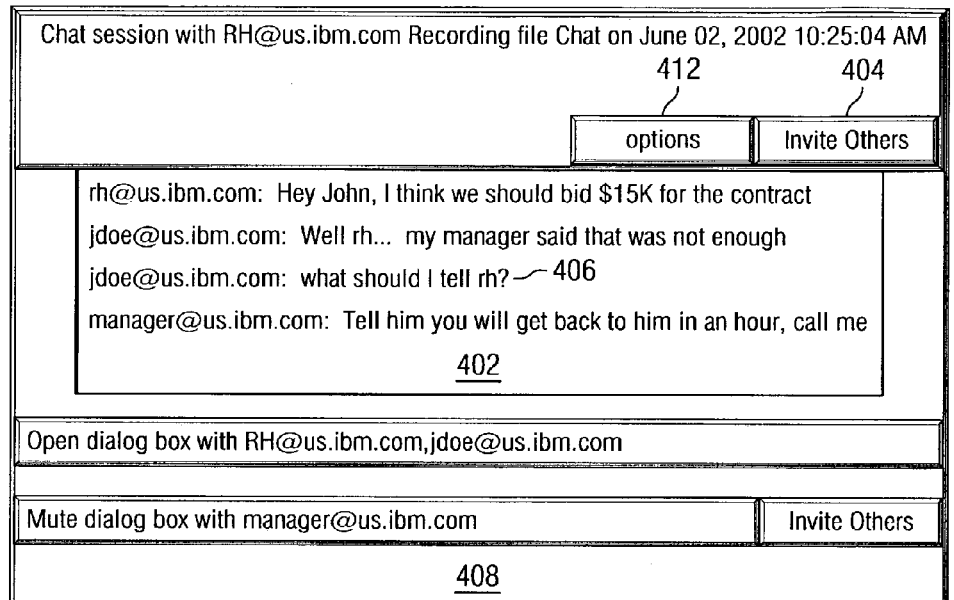
Figure 4C:
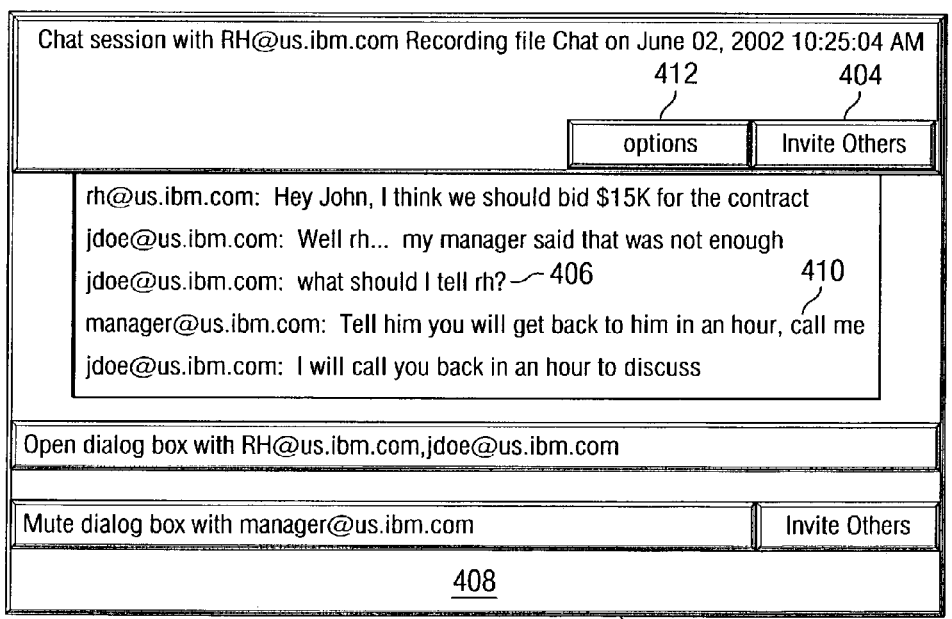

Turning next to FIGS. 4A-4C, diagrams of a messaging dialog are depicted in accordance with a preferred embodiment of the present invention. In this example, dialog 400, in FIG. 4A, is presented to a user at a messaging application, such as messaging application 300 in FIG. 3. Dialog 400 is a messaging dialog in which section 402 provides the standard presentation of messages between parties to a messaging session during a messaging session between two parties, with a third party in a stealth mode. The messages displayed in dialog 400 include "rh" and "jdoe". Dialog 400 is one used by "jdoe". Messages between "rh" and "jdoe" are seen by a third party "manager" in these examples, but not by "rh". In FIG. 4A, "jdoe" uses a third party or stealth option to get input from "manager" in the messaging session with "rh". The invite is sent in response to a selection of "Invite Others" button 404 by the user "jdoe". This initiates a process to send an invite to the third party.

The invite may result in a read only type of participation by the third party in which the third party may only see the messages sent between the other parties to the messaging session, but is not able to send messages. In this example, the third party, "manager", may send messages to "jdoe", the party sending the invite. As illustrated, "jdoe" enters message 406 in section 408 to send a message to the third party, "manager", without "rh" seeing the message. In FIG. 4B, when message 406 is sent to the third party, message 406 is displayed in section 402 of dialog 400. Message 406 is only seen by "jdoe" and "manager and not by "rh" in these examples. In FIG. 4C, a response is returned by the third party in message 410. This message is seen only by "jdoe" and "manager". The other party, "rh" does not see message 410. These messages may be emphasized to allow the user to know which messages are being seen by which parties. For example, message 406 and message 410 may be presented using a different color, font type, underlined text, bold text, italicized text, flashing text, or in association with a graphical indicator.

Options button 412 in these figures may be used to set a default for recording messages. When a recording feature is set as a default, messages sent and received during different messaging sessions are automatically saved. In this manner, the user is not required to save messages at the end of each messaging session.

Figure 5:
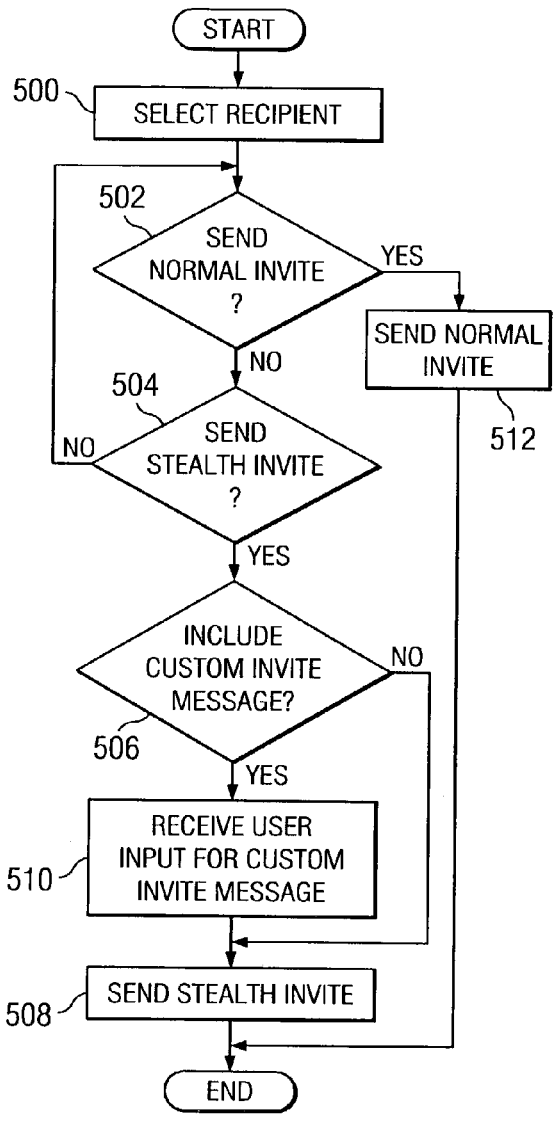
FIG. 5 is a flowchart of a process for sending a stealth invite for a messaging session in accordance with a preferred embodiment of the present invention.

Turning next to FIG. 5, a flowchart of a process for sending a stealth invite for a messaging session is depicted in accordance with a preferred embodiment of the present invention. The process illustrated in FIG. 5 may be implemented in a messaging application, such as messaging application 300 in FIG. 3. In particular, the process may be implemented as third party messaging process 302 within messaging application 300.

The process begins by selecting a recipient (step 500). Thereafter, a determination is made as to whether the invite is a normal invite (step 502). If the invite is not a normal invite, a determination is made as to whether the invite is a stealth invite (step 504). If the invite is a stealth invite, a determination is made as to whether a custom invite message is to be included (step 506). If a custom message is not to be included, the stealth invite is sent to the selected recipient (step 508) with the process terminating thereafter.

If a custom message is to be included in the invite in step 506, user input is received for the custom invite message (step 510) with the process then proceeding to step 508 as described above. With reference again to step 504, if the invite is not a stealth invite, the process returns to step 504 to determine whether an invite has been selected for the recipient. In step 502, if a normal invite has been selected, then a normal invite is sent to the selected recipient (step 512) with the process terminating thereafter.

Figure 6:
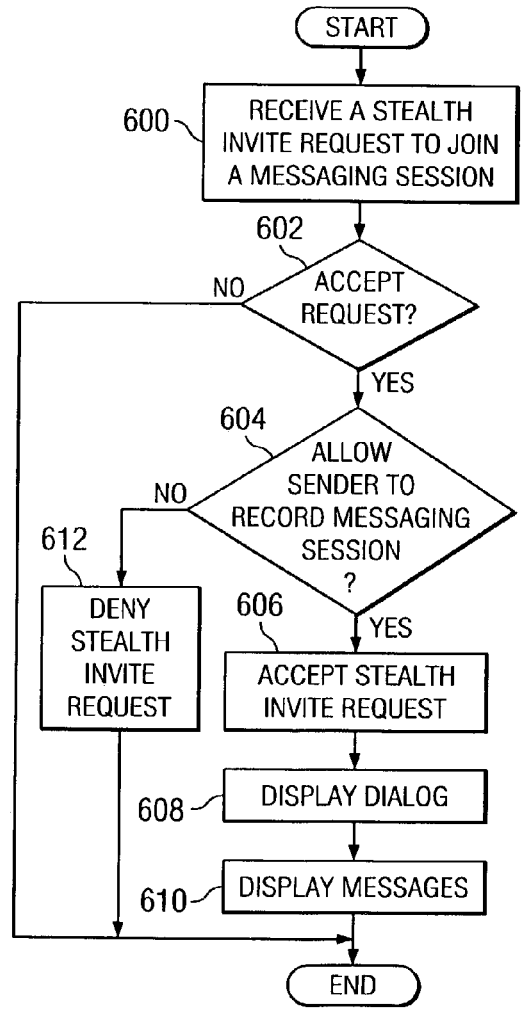
FIG. 6 is a flowchart of a process for handling an invite to a messaging system in accordance with a preferred embodiment of the present invention.

Turning now to FIG. 6, a flowchart of a process for handling an invite to a messaging system is depicted in accordance with a preferred embodiment of the present invention. The process illustrated in FIG. 6 may be implemented in a messaging program, such as messaging program 300 in FIG. 3.

The process begins by receiving a stealth invite request to join a messaging session (step 600). In this example, the message is a stealth invite, such as one sent in the process described in FIG. 5. A determination is made as to whether the request is accepted (step 602). If the request is accepted, a determination is made as to whether the sender of the request is to be allowed to record the messaging session (step 604). In this example, step 604 is an optional step in which the recipient of the invite is informed that the session will be recorded. Depending on the particular implementation, this step may be omitted. If the sender is to be allowed to record the session, the stealth invite request is accepted (step 606). Thereafter, a dialog is displayed (step 608) and messages are presented (step 610), with the process terminating thereafter. If the sender is not allowed to record the messaging session, the stealth invite request is denied (step 612) with the process terminating thereafter.

Figure 7:
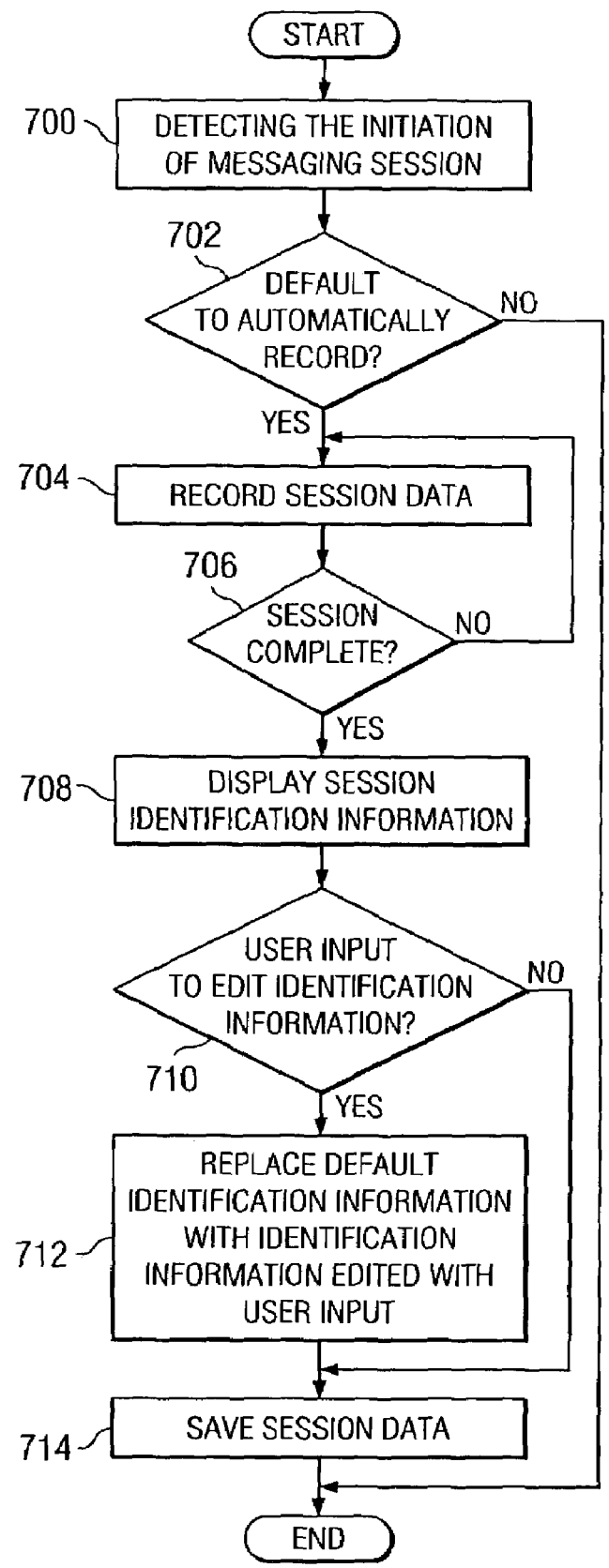
FIG. 7 is a flowchart of a process for automatically recording messages in messaging sessions in accordance with a preferred embodiment of the present invention.

Turning next to FIG. 7, a flowchart of a process for automatically recording messages in messaging sessions is depicted in accordance with a preferred embodiment of the present invention. The process illustrated in FIG. 7 may be implemented in a messaging application such as messaging application 300. In particular, this process may be implemented in recording process 304 in messaging application 300.

The process begins by detecting the initiation of a messaging session (step 700). Thereafter, a determination is made as to whether a default has been set to record messages when a messaging session starts (step 702). If a default has been set to automatically record messaging sessions, session data is recorded (step 704). Next, a determination is made as to whether a session has completed (step 706). If the session has not completed, the process returns to step 704. Otherwise, session identification information is displayed to the user (step 708). In these examples, this session identification information includes a name of a file for the messages as well as a path or folder in which the file is to be saved.

Next, a determination is made as to whether user input is received to edit the identification information (step 710). If a user input is received to edit the identification information, the default identification information is replaced with the identification information as edited with the user input (step 712). Next, the session data is saved using the identification information (step 714) with the process terminating thereafter.

Turning back to step 710, if user input editing the identification information is not received, the process proceeds to step 714 as described above. Turning back to step 702, if a default to automatically record messages is not set, the process terminates.

In this manner, the present invention provides an improved method, apparatus, and computer instructions for managing messages in a messaging application. The mechanism of the present invention allows for automatic recording of messaging systems. In addition, a stealth or hidden mode is available for third parties. A party to the messaging session may invite a third party to join the messaging session without other parties knowing of the presence of the third party. In this manner, if situations arise requiring a third party to join a messaging session unknown to the other, the third party may be added in the manner described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing messages, the method comprising:
   responsive to a request by an invitee to add a third party to a messaging session with a number of parties, responsive to receiving the request, sending a stealth invite to the third party;
   responsive to receiving an acceptance of the stealth invite, sending messages sent to and received from the number of parties to the third party without the number of parties knowing of a presence of the third party in the messaging session;
   allowing the third party to send messages only to a user sending the invation;
   responsive to initiation of the messages session, determining whether a default has been set; and
   responsive to the default being set, recording all messages sent and received during the messaging session.

2. The method of claim 1 further comprising:
   allowing the third party and the invitee to send messages to each other without the number of parties knowing of a presence of the third party in the messaging session.

3. The method of claim 1, wherein the number of parties is one party.

4. The method of claim 1, wherein the third party is disable from sending messages into the session.

5. A method in a data processing system for presenting messages, the method comprising:
   receiving an invitation to join a messaging session in an undetected mode;
   responsive to accepting the invitation, displaying a window in which messages from other parties in the messaging session are presented;
   allowing the third party to send messages only to a user sending the invitation;
   responsive to initiation of the messages session, determining whether a default has been set; and
   responsive to the default being set, recording all messages sent and received during the messaging session.

6. A data processing system for managing messages, the data processing system comprising:
   first receiving means for receiving a request by an invitee to add a third party to a messaging session with a number of parties;
   second sending means, responsive to receiving the request, sending a stealth invite to the third party;
   third sending means, responsive to receiving acceptance of the stealth invite, for sending messages sent to and received from the number of parties to the third party without the number of parties knowing of a presence of the third party in the messaging session;
   allowing the third party to send messages only to a user sending the invitation; determining means, responsive to initiation of the messaging session, for determining whether a default has been set; and
   recording means, responsive to the default being set, for recording all messages sent and received during the messaging session.

\* \* \* \* \*